US006999609B2

(12) United States Patent
Eck et al.

(10) Patent No.: US 6,999,609 B2
(45) Date of Patent: Feb. 14, 2006

(54) DEVICE AND METHOD FOR FORMING AN IMAGE COMPOSED OF A PLURALITY OF SUB-AREAS

(75) Inventors: Kai Eck, Aachen (DE); Johannes Albert Luijendijk, Eindhoven (NL); Norbert Jung, Wuerselen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 591 days.

(21) Appl. No.: 09/745,621

(22) Filed: Dec. 21, 2000

(65) Prior Publication Data

US 2001/0016057 A1 Aug. 23, 2001

(30) Foreign Application Priority Data

Dec. 23, 1999 (DE) ................. 199 62 283
May 9, 2000 (DE) ................. 100 22 407

(51) Int. Cl.
*G06K 9/00* (2006.01)

(52) U.S. Cl. ..................... 382/132; 382/171; 378/98.6; 250/267

(58) Field of Classification Search ................. 382/128, 382/129, 130, 131, 132, 133, 162, 167, 168, 382/169, 171, 172, 134, 275, 181, 284, 254, 382/291, 320, 170; 378/98.7, 65, 98.8, 28, 378/23, 46, 63, 98.4, 98.5, 98.6; 348/230.1, 348/34, 64, 65, 739; 358/504; 250/370.09, 250/267, 363.4; 345/531; 430/966
See application file for complete search history.

(56) References Cited

U.S. PATENT DOCUMENTS

| | | | | |
|---|---|---|---|---|
| 5,602,896 A | * | 2/1997 | Diepstraten | ................. 378/98.7 |
| 5,737,015 A | * | 4/1998 | Juen | ........................ 348/230.1 |
| 5,946,407 A | * | 8/1999 | Bamberger et al. | ......... 382/132 |
| 6,028,913 A | * | 2/2000 | Meulenbrugge et al. | ... 378/98.8 |
| 6,072,603 A | * | 6/2000 | Parks | ......................... 358/504 |
| 6,108,399 A | * | 8/2000 | Hernandez-Guerra et al. | ........................... 378/65 |
| 6,163,029 A | * | 12/2000 | Yamada et al. | ........ 250/370.09 |
| 6,240,162 B1 | * | 5/2001 | Hernandez-Guerra et al. | ........................... 378/65 |

FOREIGN PATENT DOCUMENTS

| | | |
|---|---|---|
| EP | 0618719 A1 | 10/1994 |
| EP | 1033868 A1 | 9/2000 |
| WO | 96/19893 | 6/1996 |

* cited by examiner

*Primary Examiner*—Daniel Miriam
*Assistant Examiner*—Seyed Azarian

(57) ABSTRACT

The invention relates to a method of and a device for forming an image which is composed of a plurality of sub-areas, a read-out unit being associated with each sub-area and image data of adjoining image areas of neighboring sub-areas being evaluated in order to mitigate differences in amplification, which device includes a detector with a plurality of sensor elements for forming image data, read-out units which are associated with the sub-areas of the image, an analysis unit which is arranged to evaluate image data from adjoining image areas of neighboring sub-areas and to generate correction data, a correction unit which is arranged to correct incorrect image data by means of correction data, thus enabling a regular and accurate recalibration or correction of non-linear amplifier behavior to be performed without necessitating an additional X-ray dose or interventions by the user.

11 Claims, 6 Drawing Sheets

DEVICE AND METHOD FOR FORMING AN IMAGE COMPOSED OF A PLURALITY OF SUB-AREAS

BACKGROUND OF THE INVENTION

The invention relates to a device for forming an image which is composed of a plurality of sub-areas, with a detector which includes a plurality of sensor elements for generating image data and read-out units which are associated with the sub-areas of the image. The invention relates to a method of forming an image which is composed of a plurality of sub-areas, with each sub-area there being associated a respective read-out unit and image data of adjoining image areas of neighboring sub-areas being evaluated in order to mitigate differences in amplification characteristics. The invention also relates to a radiation examination device for performing the method according to the invention which includes a radiation source and a detector device with an appropriate device for carrying out the method. The invention also relates to a computerprogramm for the correction of image data of an image which is composed of a plurality of sub-areas.

Methods and devices of this kind are used, for example in image generating devices of X-ray or other radiation examination devices.

WO 96/19893 discloses an image pick-up apparatus in which an image signal is decomposed into a plurality of sub-images. More specifically, the image signal is decomposed into two sub-images which are applied to respective detector fields. An overall image signal is formed from these sub-images again in a combination unit. A correction unit is provided so as to correct differences in the sub-images. To this end, brightness values of columns of a first sub-image are multiplied by a column amplification factor and brightness values of rows of a second sub-image are multiplied by a row amplification factor. The amplification factors are derived from reference images and are stored in a memory.

For most fields of application of said methods and devices, notably for medical X-ray detectors but also for ultrasound apparatus, computed tomography apparatus or magnetic resonance apparatus, it is very important that the images formed are artefact-free to a high degree. Medical images are commonly reproduced as grey scale images. For example, X-ray and ultrasound apparatus or computed tomography or magnetic resonance tomography apparatus are used to form such grey scale images.

SUMMARY OF THE INVENTION

The invention proposes a special device for a flat dynamic X-ray detector for the correction of images that contain defects. Such X-ray detectors are used for X-ray examination apparatus in the medical diagnostic field. They can be used as universal detector components in various application-specific X-ray apparatus. For their operation in the various types of application it is very important that the images produced are free from artefacts to a high degree.

Dynamic X-ray detectors are subdivided into a plurality of sub-areas, a respective read-out unit being used for each sub-area. Each sub-area comprises a plurality of image areas. The detected signals or image data of a sub-area are amplified by a read-out unit; one read-out unit then reads the plurality of image areas of a sub-area. Neighboring image areas that are situated at the edge of adjoining sub-areas, therefore, are read out by different read-out units. The inherently different amplification behavior of such different read-out units gives rise to abrupt grey scale transitions between such neighboring image areas. Such abrupt grey scale transitions appear as stripes in the image to be formed.

Such influencing is further intensified by noise suppression or image subtraction. The described artefacts become less visible as the noise component is greater. Because the human eye has an integrating property, the effectively present noise component is suppressed and the artefacts or defects become clearly visible. In the case of subtraction, required for the highlighting of image contents, two images are subtracted from one another. Such subtraction makes a difference in the amplification behavior of adjoining read-out units particularly evident.

Such differences in non-linear amplification behavior can be corrected by means of regular recalibration processes and the use of the information concerning the nonlinear amplification behavior of neighboring read-out units, which is derived during the recalibration processes. However, such a recalibration necessitates interventions by and instruction of the medical or technical staff.

In order to enable recalibration to be carried out, a predetermined number of X-ray exposures is performed with reproducible radiation doses incident on the X-ray detector. The amount of the radiation dose each detector sub-area can also be determined by the reproduction of special calibration phantoms, so that a deviation between the non-linear amplification characteristics can be derived from the differences occurring in the image.

Because such non-linear amplification behavior is subject to change, correction must be performed regularly. The change cannot be considered as a fixed parameter over the service life of an imaging system. Such a non-linear amplification behavior can be induced by changes of the detector position, by inhomogeneous heat losses or also be the result of aging of the amplifier circuits.

Such corrections that have to be performed manually at regular intervals have the drawback that on the one hand the attendant staff must intervene and that on the other hand additional X-ray exposures are required for the regular manual corrections. An adaptation table with correction data based on such manual correction would be used for all subsequent image data until a manual correction is performed again. Consequently, changes in the amplification behavior which occur in the mean time are not taken into account.

Therefore, it is an object of the invention to provide a device and a method that enable regular and accurate recalibration or correction of non-linear amplification behavior to be performed without additional X-ray doses or user interventions being required.

This object is achieved by means of a device for forming an image which is composed of a plurality of sub-areas, which device includes a detector which includes a plurality of sensor elements for generating image data, read-out units which are associated with the sub-areas of the image, an analysis unit which is arranged to evaluate image data from adjoining image areas of neighboring sub-areas and to generate correction data, and a correction unit which is arranged to correct incorrect image data by means of correction data.

The X-ray detector is composed of a matrix of sensor elements which are arranged in rows and columns. The image produced by the X-ray detector can be subdivided into sub-areas, each sub-area including a plurality of image areas and a respective read-out unit being associated with each sub-area. The read-out units serve to amplify detected image data.

The read-out units are constructed as amplifiers and each amplifier amplifies the image data applied thereto with an inherent non-linear amplification characteristic; this leads to deviating amplification of the image data.

The invention is based on the idea that the image data of adjoining image areas of neighboring read-out units do not exhibit abrupt changes of value. It may indeed be assumed that the image data of neighboring image areas assume approximately the same values. Conversely, it can be deduced that the occurrence of an abrupt change of value may be attributed to non-linearities.

The image data of medical images concern mainly grey scale values. An image area may be formed by an image column or image row or parts thereof and contains a plurality of pixels. It is assumed that the grey scale values of neighboring image areas have the same grey value scales.

For color images, in which the image data is represented by a vector containing the RGB components, it may also be assumed that adjoining image areas of neighboring sub-areas normally assume the same values. The same holds for images represented by amplitude values and phase values.

In order to achieve high-quality correction, a series of special rules is formed on the basis of the described assumption.

Pairs of grey scale values which belong to adjoining image areas of neighboring sub-areas and whose difference in grey scale value exceeds a selectable threshold value are not taken into account for the formation of the correction data, because it is very likely that this difference is not due to the non-linear amplification behavior of the neighboring read-out units. Furthermore, image areas in which an interpolation was performed by a preprocessing operation on the basis of pixel errors are also excluded from the formation of the correction data. Image areas which are situated in the direct vicinity of collimator shutters whose position is calculated by means of an algorithm are also not taken into account for the formation of the correction data.

The grey scale values of neighboring image areas which are amplified by different amplifiers are analyzed in an analysis unit. The analysis unit produces correction data on the basis of image data received from adjoining image areas of neighboring read-out units. The correction data is applied to the incorrect image data in a correction unit in such a manner that the image data of, for example, the right-hand sub-area, amplified by means of the respective amplification characteristic, are adapted to the first amplification characteristic of the neighboring left-hand sub-area. This correction is then applied to all image areas belonging to this sub-area.

The correction or adaptation is performed for all sub-areas, so that image defects due to different non-linear amplification characteristics no longer occur after this correction.

The correction data is preferably stored in a memory. It can be fetched therefrom at any time so as to be used in the correction unit.

Preferably, the image data generated by the detector is applied to the analysis unit only at a reduced clock rate. The calculation of the correction data requires an effort proportional to the required accuracy, so that, for example, only every second image from the detector is applied to the analysis unit. The accuracy of the correction is not degraded by this delay, because changes in the amplification behavior of the read-out units do not occur in these time relations but can be observed over prolonged periods of time only.

The analysis unit includes a histogram generator. The histogram generator receives image data of neighboring image areas of adjoining sub-areas.

A respective histogram is formed concerning the occurrence of the corresponding grey scale values of each of the two image areas observed. Depending on the desired accuracy of the correction, the grey scale values are classified in classes. The relevant image data is applied to the histogram generator over a given period of time. These two histograms, in which the occurrence of the corresponding grey scale values of the individual image areas is reproduced over the entire range of feasible grey scale values, are applied to the summing unit.

The summing unit forms a cumulative histogram each time from the histograms produced in the histogram generator. The resultant cumulative histograms also exhibit differences. A different amplification behavior of the read-out units amplifying the neighboring sub-areas can be attributed to these differences.

From an analytical point of view the histogram generator forms density functions which are integrated in the summing unit, so that in this case the distribution functions are formed from the density functions.

The adaptation unit calculates a functional dependency of the image data of the second image area on the image data of the first sub-area. This functional dependency is taken up in an adaptation table as a confrontation of corresponding grey scale values. The correction data represent the contents of the adaptation table applied to the incorrect image data by the correction unit.

The image data is corrected in the correction unit by application of an adaptation table of this kind in such a manner that defects or artefacts which are due to a different amplification behavior are no longer visible in the X-ray image after this correction.

A display unit displays a medical image, for example intended for diagnostic purposes, which has been freed from such errors.

The calculation of the correction data in the analysis unit is not restricted to the application in the X-ray field, but can be used in all fields of signal processing in which a time-invariant non-linear amplifier behavior occurs.

For the generation of the correction data it is also possible to use, in dependence on the application, a plurality of image areas of the sub-areas to be adapted, the density functions or histograms thereof then being linked by means of a suitable operation.

In a further prefered embodiment, according to the invention the pixels situated at the boundary are observed and, while utilizing the image data of the adjoining pixels of the neighboring sub-area, estimated values or reference values are determined for these pixels. These reference values indicate the value that the image value associated with the pixel should have if the read-out units were to have approximately the same amplifier characteristics. Thus, a correction value is determined by comparison of the actual image value of the relevant pixel and the estimated value determined; this correction value serves to correct the respective image value occurring in the sub-area to be corrected.

In the simplest case the correction value may be a correction factor which is formed from the ratio of the estimated value to the image value. For the relevant image value and for the sub-area to be corrected this correction value can be taken up in an adaptation table or a so-called Look-Up Table. Needless to say that it is also possible to take up the product of the image value and the correction value, or in the above case the relevant estimated value itself, directly in such an adaptation table for the relevant image value.

In the simplest case the image value of a directly adjacent pixel of the neighboring sub-area can be used as the estimated value. In this case it is assumed that no changes whatsoever occur at the boundary between one sub-area and the other. Such a correction, based merely on a comparison of individual pixels to each side of a boundary between sub-areas, does not require a large amount of calculation work and, therefore, can be quickly and simply carried out. However, it has the drawback that a slight gradient which actually occurs in the image and extends across the boundary is locally eliminated at the area of the boundary by calculation, and hence an error is produced again.

In a further, preferred method which takes into account such gradients at the area of the boundary image values of pixels of the adjoining image area of the neighboring sub-area are extrapolated across the boundary in order to determine the estimated value. The term "adjoining image area", therefore, is not restricted to the directly adjoining row or column of the neighboring sub-area, for example, in the case of a detector consisting of rows and columns, but also covers a combination of several rows or columns or parts of rows or columns when this combination overall adjoins another sub-area by way of one side.

In the simplest case this extrapolation is performed over only two pixels of a sub-area which are situated adjacently and transversely of the boundary line. Needless to say, however, that it is also possible to perform such an extrapolation over an arbitrary number of pixels which are adjacently situated pixels on one line.

In an especially preferred embodiment a first correction value is formed first of all for the image value of a pixel of the sub-area to be corrected. Subsequently, for a neighboring pixel of the neighboring sub-area which directly adjoins this pixel of the sub-area to be corrected there is determined an estimated value for the neighboring pixel while utilizing image values of the sub-area to be corrected. This is done in the same way as the determination of the estimated value for the pixel of the sub-area to be corrected itself. This means that an extrapolation over the values of the pixels of the neighboring sub-area is performed across the boundary for the pixel of the sub-area to be corrected; conversely, an extrapolation is performed over the image values of the pixels of the sub-area to be corrected in order to obtain the estimated value for the neighboring pixel. A second correction value is then formed by comparison of this estimated value for the neighboring pixel with the actual image value of the neighboring pixel. Finally, from these two correction values there is derived a common correction value which is applied to the relevant image values of the sub-area to be corrected. This common correction value may be the mean value of the two correction values. A further possibility consists in that, for example, a weighted mean value is calculated.

The estimation process can in principle be performed for all pixels situated along a boundary. In that case it is to be assumed that many of the pixels have the same image value. It would make more sense to form a common correction value for the relevant image values in the sub-area to be corrected from the correction values of different pixels of the sub-area to be corrected which have the same image value. This can be performed, for example by forming the mean value, the modulus or the median.

The correction values determined for the individual image values of the individual sub-areas are stored in an adaptation table and are fetched therefrom for the purpose of correction. The correction values may in principle again be correction factors which are applied to the relevant image value. However, they may, of course, also be previously corrected finished values simply substituted for the relevant image value.

Because it is not likely that all possible image values occur along a boundary of a sub-area, for some of the image values this correction method does not yield data for all possible image values during the formation of a relevant adaptation table. However, any gaps arising can be readily filled in by interpolation between the correction values found by means of said method. In order to keep the required amount of calculation work small, in given circumstances it will even suffice to determine a correction factor directly for single image values only and to determine the remainder of the table by interpolation while spending only a small amount of arithmetic work.

In conformity with the foregoing, the device for carrying out the method includes a memory for the storage of such an adaptation table. Using the adaptation table stored in this memory, the image values are then always corrected in a correction unit for being displayed on a display unit.

It is in principle possible to apply the correction values acquired by means of a given image directly to this image when the image data is delayed on its way to the correction unit. In order to increase the processing speed, however, it makes sense to use the correction values produced for previous images, or an adaptation table formed therefrom, and to check and correct this adaptation table in the memory each time by means of the new data.

For example, a sliding mean value can then be generated over the contents of the adaptation tables acquired from successively formed images. This means that the correction values are averaged each time over the last images and it is useful to perform a weighting operation during the formation of the mean value. In that case it is advantageous to attach less weight to a new set of correction values than to the contents of the adaptation table present in the memory, because this table has already been formed from a mean value of the preceding images. Short-term fluctuations which could be due to other errors are thus suppressed.

Because changes in the amplification behavior of the read-out unit usually do not occur in time relations corresponding to the intervals between individual images of a series of images but can rather be observed over prolonged periods of time, the amount of calculation work required can in principle also be reduced by applying images to the analysis device only with given intervals in time, for example only every second or third image, in order to check or correct the adaptation table in the memory.

The calculation of the correction data by means of said method is not restricted to applications in the X-ray field. It can be applied in all fields of signal processing wherein h a time-invariant, non-linear amplifier behavior occurs between different image areas of a common image.

A radiation examination device according to the invention, notably an X-ray examination device, includes a radiation source and a detector device. The detector device includes a detector with a plurality of sensor elements, several sensor elements being combined so as to form sub-areas and each of said sub-areas being provided with a respective read-out unit. The detector device also includes an analysis unit for the evaluation of image data of adjoining image areas of the neighboring sub-areas and for producing correction data, the analysis unit including means for forming the estimated value by means of the method according to the invention and means for forming a correction value while utilizing the estimated value. The detector device also includes a correction unit which serves to correct incorrect image data while utilizing the correction data acquired.

The object of the invention is also achieved by means of a method of forming an image composed of a plurality of sub-areas, wherein a read-out unit is associated with each sub-area and image data of adjoining image areas of neighboring sub-areas are evaluated in order to mitigate differences in amplifier characteristics.

The object of the invention is also achieved by means of an X-ray examination apparatus which includes an X-ray source for emitting X-rays and for forming an X-ray image, an X-ray detector which serves to derive an optical image from the X-ray image, contains sensor elements which are arranged in rows and columns, and at least two associated amplifiers for reading out detected image data, at least one amplifier for reading out detected image data being associated with each sub-area, an analysis unit for generating correction data on the basis of the evaluation of image data of adjoining sub-areas of neighboring amplifiers, and a correction unit for the correction of the incorrect image data by means of the correction data.

The object of the invention is also achieved by means of a computer program for the correction of image data of an image composed of a plurality of sub-areas, a respective read-out unit being associated with the sub-areas of the image and image data of adjoining sub-areas of neighboring read-out units being evaluated by the formation of a histogram in order to generate correction data after integration of the histograms, which correction data is used to adapt the image data of one sub-area to the amplifier characteristic of the read-out unit amplifying the adjoining sub-area.

BRIEF DESCRIPTION OF THE DRAWINGS

Further details and advantages of the invention will become apparent from the dependent claims and the following description in which an embodiment of the invention will be described in detail with reference to the Figures. Therein:

FIG. 10b shows a distorted X-ray image of the detector shown in FIG. 10a;

DESCRIPTION OF THE PREFERRED EMBODIMENTS

Figure 1:
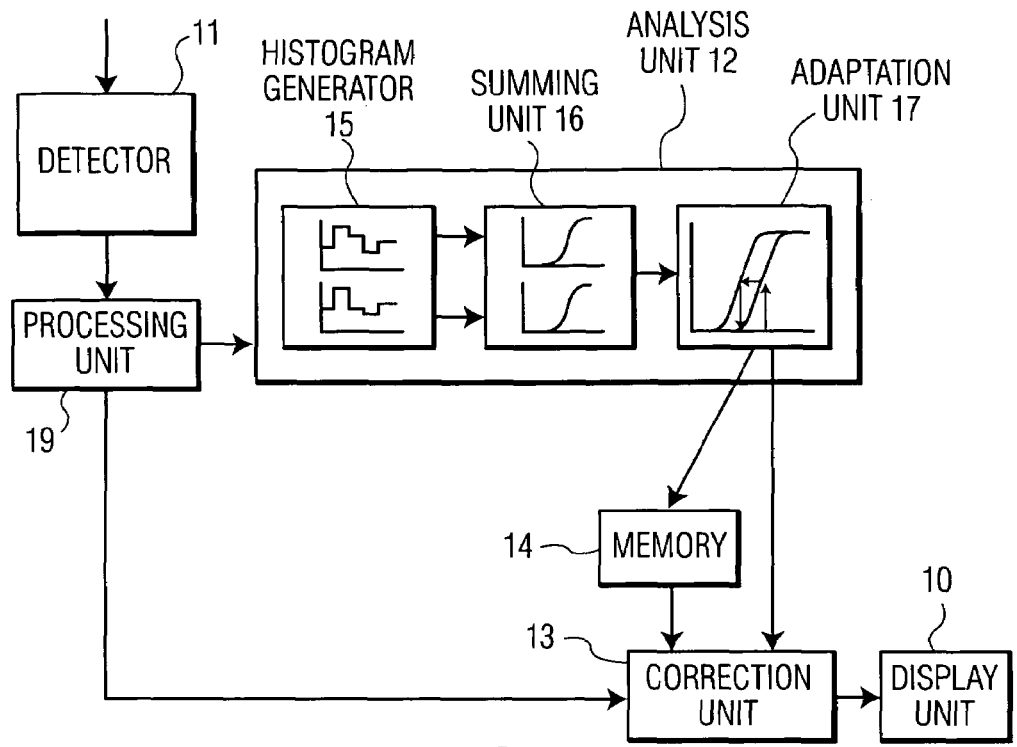
FIG. 1 shows diagrammatically the construction of a device for forming images.

FIG. 1 shows the construction of a device according to the invention. The detector 11 generates the image data which is applied to a preprocessing unit 19 and therefrom to the analysis unit 12 and the correction unit 13. For example, an offset correction is performed already in the preprocessing unit. The histogram generator 15 in the analysis unit 12 generates a respective histogram from the image data of adjoining image areas of neighboring sub-areas. The histograms are applied to the summing unit 16 in which the cumulative histograms are formed from these histograms. The adaptation unit 17 calculates the corresponding grey scale value of the other image area for each grey scale value observed for the one image area. The functional dependency of the image data observed is produced on the basis of this calculation. The correction data thus produced is applied directly to the correction unit 13 and is also stored in a memory 14 in always the most updated form. The image data from the detector, applied directly to the correction unit 13, is then corrected by means of the correction data in the adaptation table and is transferred to the display unit 10 which need not necessarily be attached directly to this device, but may also be present in a remote station; it is then connected thereto via a data network.

Figure 2:
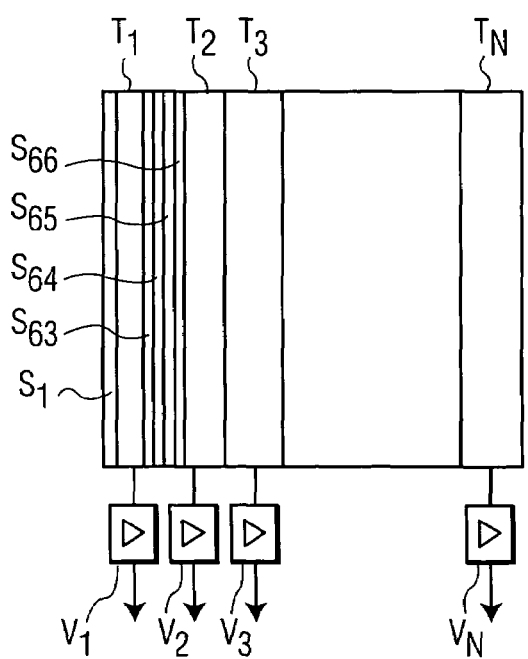
FIG. 2 shows the construction of a detector.

FIG. 2 shows diagrammatically the typical construction of an X-ray detector. An X-ray detector of this kind converts incident X-rays into, for example, visible light which is detected by photosensors and applied to the read-out units. Also known are X-ray detectors which convert the X-rays directly into electric charges. The detector shown has a plurality of sub-areas $T_1$ to $T_N$, each of which comprises a plurality of image areas. In the present embodiment an image area is represented by one or more adjacently situated image columns which contain a plurality of adjacently situated sensor elements. The sub-area $T_1$ contains 64 image columns $S_1$ to $S_{64}$. The adjoining sub-area $T_2$ and all subsequent sub-areas $T_3$ to $T_N$ also contain 64 image columns each. With each sub-area $T_1$ to $T_N$ there is associated a respective read-out unit, which read-out units are in this case implemented as respective amplifiers $V_1$ to $V_N$.

The image data of the adjoining image columns $S_{64}$ and $S_{65}$, amplified by the amplifiers $V_1$ and $V_2$, is applied to the analysis unit, that is, first to the histogram generator 15 included therein.

Figure 3:
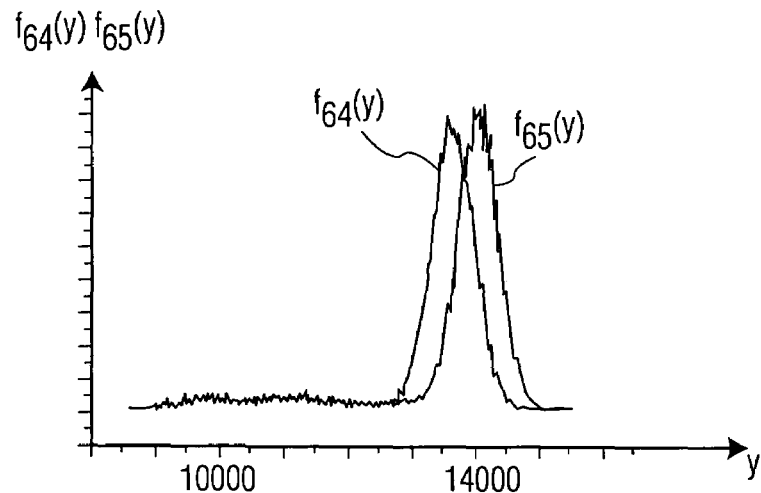
FIG. 3 shows density functions of image data of adjoining image areas of neighboring read-out units.

FIG. 3 shows the histograms of the two image columns $S_{64}$ and $S_{65}$ observed. It appears clearly that the image data of the image column $S_{64}$ exhibits a maximum for a grey scale value around 13,500 and that the image data of the image column $S_{65}$ has its maximum at y=14,000. The histogram generator produces a histogram with a classification of the grey scale values in grey scale classes or areas, the frequency of occurrence of a grey scale value in the supplied image data of the image area observed being represented in the relevant class.

Based on the assumption that the image data of adjoining image columns of neighboring amplifiers normally has the same grey scale values, the present case involves a difference which can be attributed to a difference in amplification behavior of the amplifiers $V_1$ and $V_2$. In the case of the same amplification behavior, the variations of the density functions $f_{64}(y)$ and $f_{65}(y)$ would register.

Figure 4:
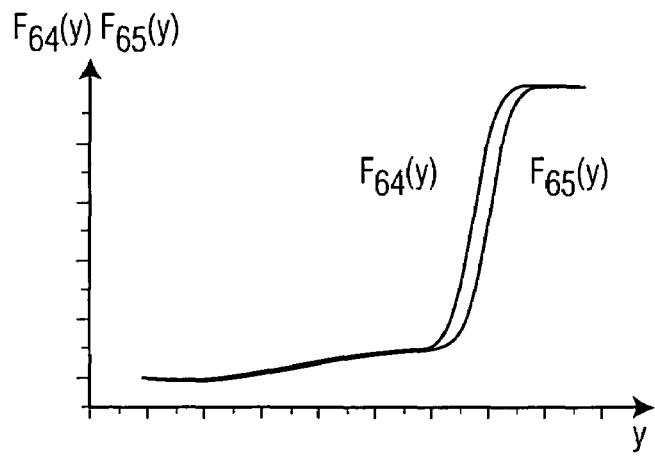
FIG. 4 shows probability functions of the image data.

FIG. 4 shows the integrated, or in this case the summed, variation of the density functions $f_{64}(y)$ and $f_{65}(Y)$. When the density functions $f_{64}(y)$ and $f_{65}(y)$ of the image columns $S_{64}$ and $S_{65}$ are applied to the summing unit, the cumulative histograms or the distribution functions $F_{64}(y)$ and $F_{65}(y)$ of the density functions are formed. These cumulative histograms represent the variation of the summing of the absolute grey scale values and indicate the probability that a grey scale value is below a given value.

Figure 5:
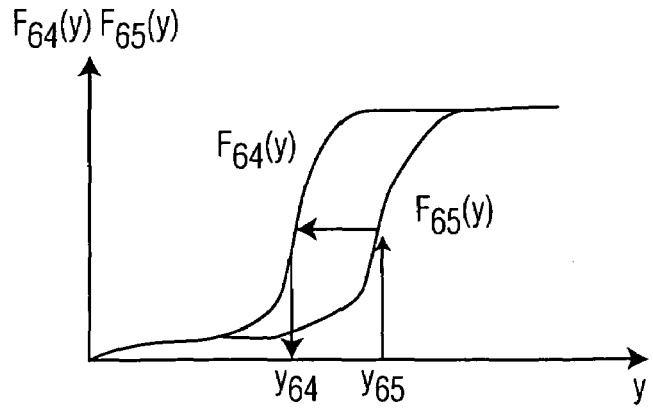
FIG. 5 illustrates the adaptation of the image data.

FIG. 5 shows the adaptation performed in the adaptation unit 17. To this end, the distribution function value $F_{65}(y)$ is determined from the distribution function (step 1) for each grey scale value $y_{65}$. This distribution function value $F_{65}(y)$ is used to find the distribution function value $F_{64}(y)$ (step 2). For this distribution function value $F_{64}(y)$ the grey scale value $y_{64}$ of the distribution function $F_{64}(y)$ is determined. The adaptation table $A(T_2 \rightarrow T_1)$ of grey scale values $y_{65}$ thus determined for grey scale values $y_{64}$ represents a rule in the form of a table for the adaptation of the image data of the sub-area $T_2$ to the sub-area $T_1$.

Repeatedly performing these adaptation steps on each time two neighboring sub-areas yields correction data which is suitable for adapting these two sub-areas each time in respect of their amplification characteristics. Application of the adaptation table $A(T_2 \rightarrow T_1)$ to the adaptation table $A(T_3 \rightarrow T_2)$ in order to adapt the sub-area $T_3$ to the sub-area $T_2$ results in an adaptation table $A(T_3 \rightarrow T_1)$ for adapting the sub-area $T_3$ to the sub-area $T_1$. Adaptation tables are thus found for all amplification characteristics of the sub-areas $T_1$ to $T_N$; these tables can be used directly in the correction unit with the same expenditure on time.

Figure 6:
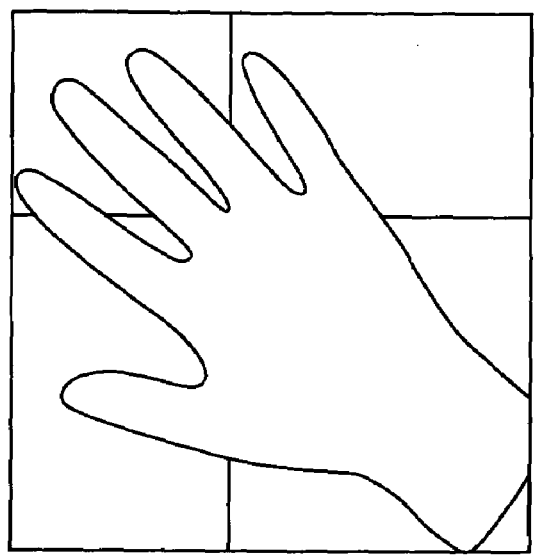
FIG. 6 shows an X-ray image containing defects.

FIG. 6 shows an X-ray image containing artefacts in the form of stripes.

Figure 7:
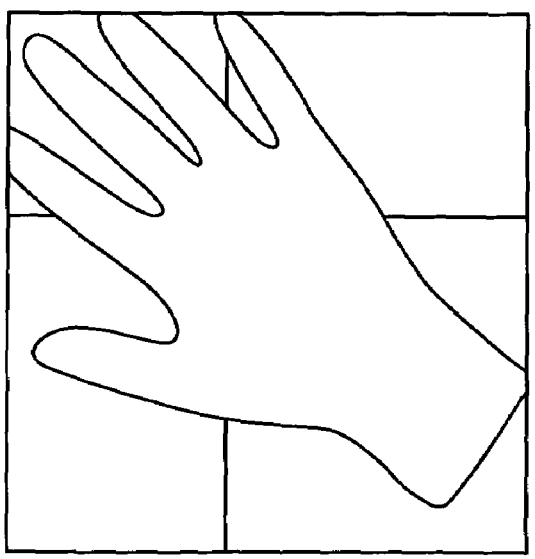
FIG. 7 shows an X-ray image wherefrom defects have been removed.

FIG. 7 shows the X-ray image corrected by means of the method according to the invention.

A flat X-ray detector used has, for example, a surface with 1024×1024 sensor elements. Each grey scale value detected by this X-ray detector is encoded by way of 10 bits. The image repetition frequency amounts to approximately 30 images per second. Thus, it is necessary to refrain from applying each individual image to the analysis unit and to apply instead, for example, only every second image. The analysis unit calculates the correction data of the adaptation tables; for all single images to be processed during this calculation there is performed a correction by means of the respective instantaneous adaptation table which is stored, for example, in the memory.

Figure 10A:
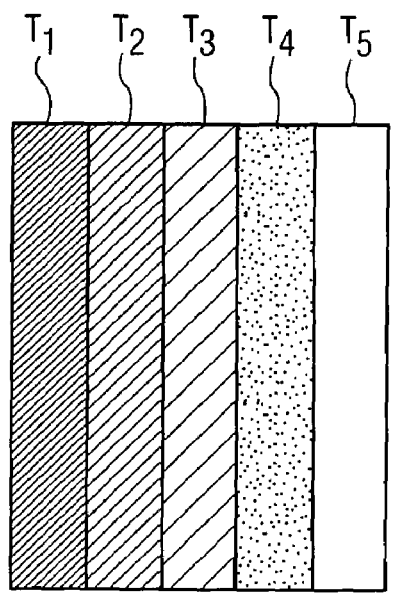
FIG. 10a shows an image of an X-ray detector subdivided into a plurality of sub-areas, with each pixel of a given sub-area there being associated an unambiguous grey scale value which is characteristic of the sub-area.

FIG. 10a shows an image of a real detector with five sub-areas $T_1$ to $T_5$. Each sub-area $T_1$ to $T_5$ in this detector again has 64 image columns. In order to make it unambiguously clear which pixel in the image belongs to which sub-area $T_1$ to $T_5$, that is, to optically visualize the boundaries G between the sub-areas $T_1$ to $T_5$, a given grey scale value is assigned to each pixel of a sub-area $T_1$ to $T_5$ in this image; this grey scale value is characteristic of the respective sub-area. Because the images of X-ray analysis devices or similar apparatus are customarily displayed in grey scale values, hereinafter image values are also taken as grey scale values. Evidently, however, the invention is not restricted to such grey scale values and any other image data may also be concerned, for example, in the case of color images it may be image data represented by a vector containing the RGB components. It may also concern images which are represented by amplitude and phase values.

The method shown in FIG. 10a for the representation of the pixels, associated with a given amplification channel, by means of a given, predetermined grey scale value is particularly useful to determine which pixel belongs to which amplification channel in the case of detectors having a complex structure. For the conventional detectors, being grouped in individual image columns and adjacently situated image columns being assigned a readout unit, it suffices to define merely the horizontal co-ordinate constituting the boundary between two sub-areas.

Figure 10B:
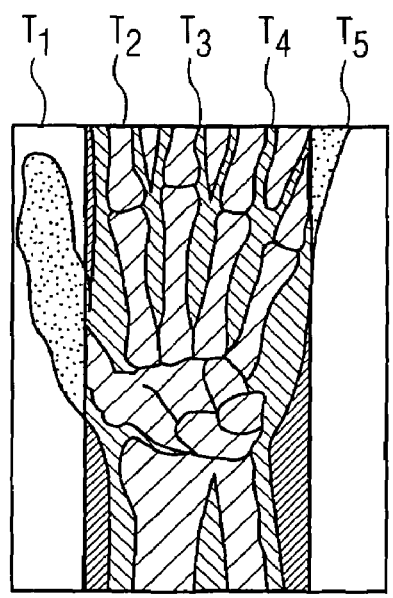

FIG. 10b shows an image of a hand which has been formed by means of the X-ray detector shown in FIG. 10a. The disturbing formation of stripes due to the different amplification behavior of the read-out units of the individual sub-areas $T_1$ to $T_5$ is clearly visible.

Figure 9:
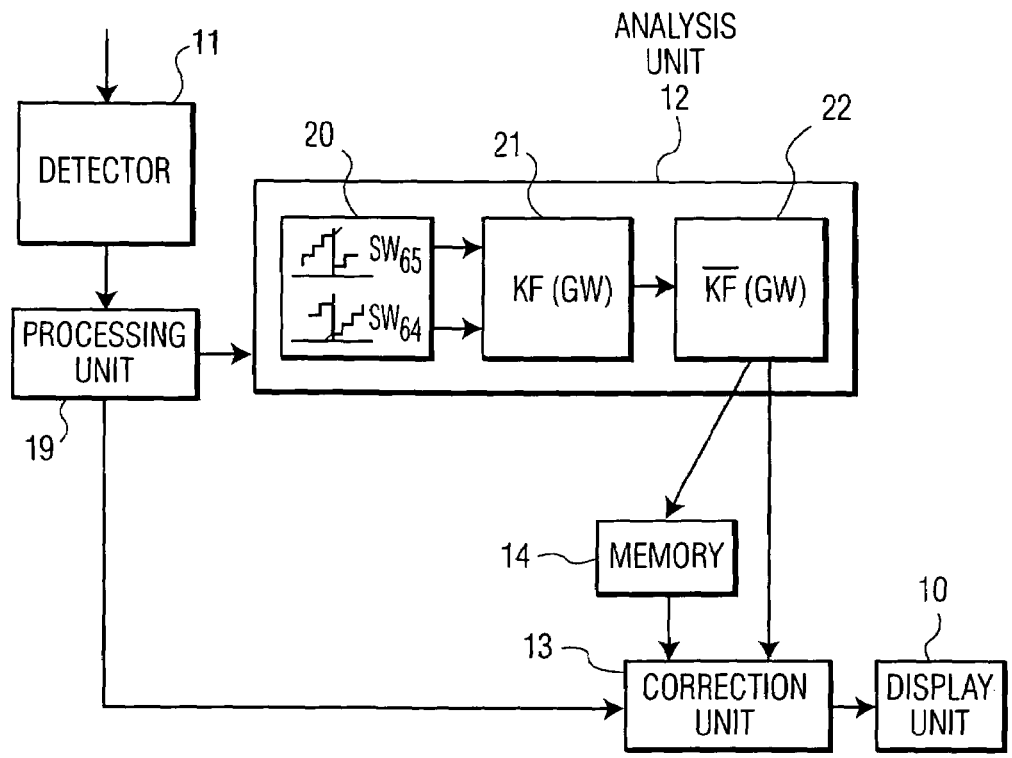
FIG. 9 shows diagrammatically the construction of a device for the formation of images.

FIG. 9 shows a device according to the invention which is intended to avoid such formation of stripes. The image produced by the detector 11 and prepared in a preprocessing unit 19 which performs, for example, an offset correction, is applied to a correction unit 13. The image values of the individual pixels of the individual sub-areas are corrected in the correction unit 13 in such a manner that the amplification curves of the readout units $V_1$ to $V_N$ of the individual sub-areas $T_1$ to $T_N$ are adapted to one another. The corrected image is then displayed on a display unit 10.

In order to acquire the correction values for the correction of the image data, the images from the preprocessing unit 19 are also applied to an analysis device 12. A respective correction factor KF is formed for the individual image values GW of a given sub-area $T_1$ to $T_N$ in the analysis device 12. These correction factors are then stored in the form of an adaptation table LUT in a memory 14 wherefrom they can be fetched at any time by the correction unit 13 in order to correct an image. Alternatively, of course, the analysis device 12 can also apply the correction factors KF directly to the correction unit 13.

Figure 8:
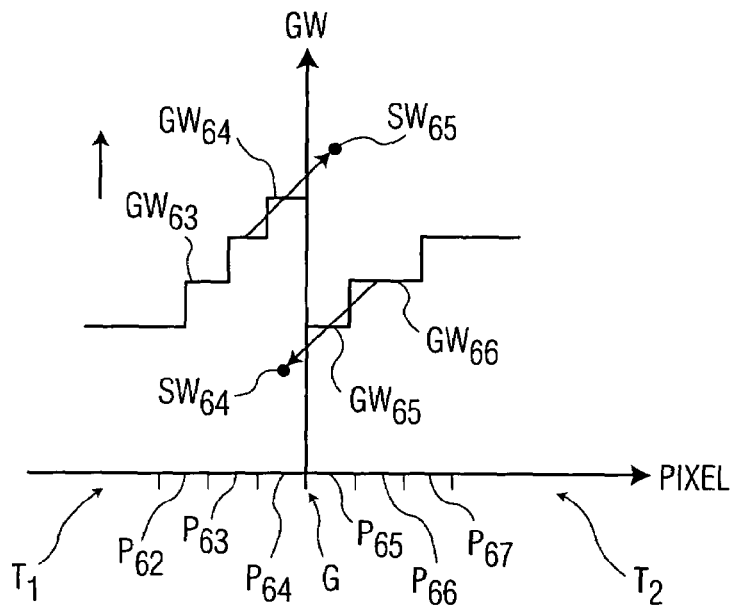
FIG. 8 illustrates diagrammatically the extrapolation for obtaining an estimated value at a boundary between two sub-areas.

In the present embodiment the correction factors KF are determined as shown in FIG. 8. In this Figure the grey scale values GW are plotted over the individual pixels along a row of the detector, that is, perpendicularly to a boundary G between two sub-areas $T_1$ to $T_N$; in this case only the pixels $P_{62}$ to $P_{67}$ of the last three image columns $S_{62}$ to $S_{64}$ of the first sub-area $T_1$ and the first three image columns $S_{65}$ to $S_{67}$ of the second sub-area $T_2$ are shown.

As is shown in FIG. 8, the last pixel $P_{64}$ of the first sub-area $T_1$ has a given grey scale value $GW_{64}$ and the first pixel $P_{65}$ of the second sub-area $T_2$, which pixel directly adjoins the pixel $P_{64}$, has a different grey scale value $GW_{65}$. This means that the grey scale value changes abruptly from the last pixel $P_{64}$ of the first sub-area $T_1$, across the boundary G, to the first pixel $P_{65}$ of the second sub-area $T_2$.

For the correction method according to the invention it is assumed that this transient may be attributed to the different amplification characteristics of the two amplifiers $V_1$ and $V_2$. In order to match the different amplification characteristics, therefore, a search is made for correction values whereby the grey scale values of the second sub-area $T_2$ are adapted to the grey scale values of the first sub-area $T_1$.

To this end, first an estimated value $SW_{65}$ is determined for the grey scale value $GW_{65}$ of the first pixel $P_{65}$ of the second sub-area $T_2$. This estimated value $SW_{65}$ is determined by extrapolation over the grey scale values $GW_{63}$ and $GW_{64}$ of the two pixels $P_{63}$ and $P_{64}$ of the first sub-area $T_1$. The quotient of the estimated value $SW_{65}$ and the actual grey scale value $GW_{65}$ of the pixel $P_{65}$ then yields a correction factor for all grey scale values in the sub-area $T_2$ which correspond to grey scale value $GW_{65}$ of the pixel $P_{65}$ observed.

In order to improve the adaptation, in the present embodiment an estimated value $SW_{64}$ is formed for the last pixel $P_{64}$ of the first sub-area $T_1$ in the same way by an analogous extrapolation at the boundary G from the right-hand side, that is, over the grey scale values $GW_{65}$ and $GW_{66}$ of the pixels $P_{65}$ and $P_{66}$. A second correction factor is derived from the ratio of the actual grey scale value $GW_{64}$ to the estimated value $SW_{64}$; this second correction factor corresponds to the first correction factor in the ideal case. A mean value can be formed from these two correction factors; this mean value is ultimately used as the correction value determined for the pixel $P_{65}$.

This method is performed for all pixels of the first image column $S_{65}$ of the second sub-area $T_2$. Generally speaking, a plurality of correction factors will then be determined for a given grey scale value GW, because this grey scale value GW may possibly be present at various pixels of the image column $S_{65}$. These correction values for each time the same grey scale values are accumulated and, for example, a mean value is formed therefrom. Evidently, it is also possible, and possibly even better, be it also more calculation time consuming, to use other means for combining the various correction values for one and the same grey scale value of a sub-area. For example, all correction values for a grey scale value can be taken up in a histogram, after which the modulus or the median is determined. Individual statistical errors of the method are thus corrected particularly well.

This procedure within the analysis device 12 is shown again in FIG. 9. In a first unit 20 two estimated values $SW_{65}$ and $SW_{64}$ are formed from the right and from the left by extrapolation at a boundary G. The unit 21 then forms a correction factor KF(GW) for a given grey scale value GW from these estimated values $SW_{65}$ and $SW_{64}$. In a subsequent unit 22 all correction factors KF are averaged for a given grey scale value GW so as to obtain the ultimate correction factor for this grey scale value GW. The analysis device 12 of the memory 14 and the correction unit 13 may in principle be formed by a common computer; the individual units 20, 21, 22 could then also be implemented as appropriate software in the computer.

This procedure for determining the correction factors is performed for each sub-area, a sub-area $T_i$ being adapted each time to the directly preceding, neighboring sub-area $T_{i-1}$. This means that the grey scale values of the sub-area $T_2$ are adapted to the sub-area $T_1$, the grey scale values of the sub-area $T_3$ to the sub-area $T_2$ etc. All sub-areas $T_2$ to $T_N$ are thus successively adapted to the sub-area $T_1$.

In order to obtain a respective absolute correction value, related to the first sub-area $T_1$, for each sub-area $T_2$ to $T_N$, the relative correction values of the individual sub-areas $T_i$ (related to their preceding neighboring sub-area $T_{i-1}$) must be multiplied each time by the absolute correction values $T_{i-1}$ of the preceding neighboring sub-area.

It must be emphasized again that this algorithm does not eliminate the non-linearity of the individual amplifiers, but only adapts the non-linearities of the channels to one another. The correction factors thus determined for the individual grey scale values for each individual sub-area $T_1$ to $T_N$ are then taken up in an adaptation table LUT in the memory 14.

Normally speaking, not all feasible grey scale values GW necessarily occur in the respective first image columns of a sub-area $T_1$ to $T_N$, because most detectors involve several tens of thousands of different grey scale values. The adaptation table can then simply remain empty for these grey scale values and interpolation methods can be used so as to fill in the values. The size of the adaptation table can also be reduced, for example by combining the correction values for a plurality of grey scale values in the adaptation table. That is, a plurality of grey scale values are combined and provided with a common correction factor. This makes sense notably when the differences in non-linearity vary only slowly as a function of the grey scale value.

Figure 10C:
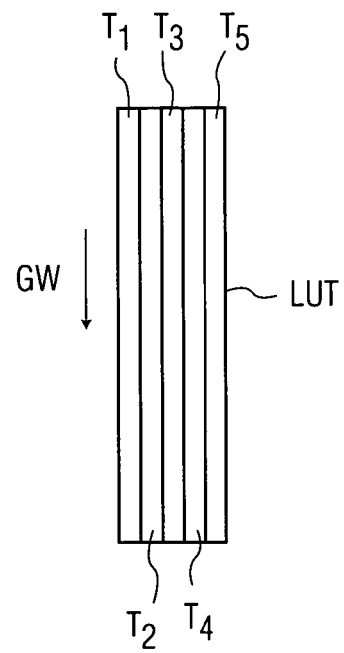
FIG. 10c shows the adaptation table in the form of grey scale values for the correction of the image shown in FIG. 10b.

FIG. 10c shows an adaptation table LUT for the five sub-areas $T_1$ to $T_5$ of the detector shown in the FIGS. 10a and 10b. A grey scale value is plotted each time as a correction factor which replaces the respective grey scale value occurring in the sub-area. In the representation shown the grey scale values GW to be replaced for the sub-areas $T_1$ to $T_5$ increase from the top downwards in the marked direction of the arrow. For each sub-area $T_1$ to $T_5$ the adaptation table LUT contains only a single vector of entries which extends in the direction of the arrow. The expansion in the width is performed merely for a better representation of the different sub-areas $T_1$ to $T_5$. As is clearly shown, the grey scale values themselves are entered only in the sub-area $T_1$. This means that the sub-area $T_1$ is corrected quasi with a correction factor 1.0, because all further sub-areas $T_2$ to $T_5$ are adapted to this first sub-area $T_1$.

Figure 10D:
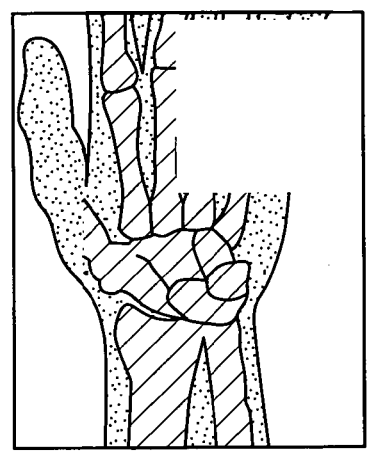
FIG. 10d shows the distorted X-ray image of FIG. 4b after correction by means of an adaptation table as shown in FIG. 10c.

Finally, FIG. 10d shows the X-ray image of FIG. 10b after application of the correction values from the adaptation table LUT of FIG. 10c to the image data. It is clearly shown that the undesirable stripes have been fully eliminated.

An extrapolation over each time two pixels was performed so as to find the estimated value in the illustrated example. It will be evident that an extrapolation over several adjacently situated pixels can also be performed. It is, of course, also possible to perform the method without such extrapolation. For example, in the simplest case direct adaptation can be performed between two neighboring pixels. This means that for the estimated value for the grey scale value of a given pixel in the first image column $S_{65}$ of the second sub-area $T_2$ use is made of the grey scale value of the neighboring pixel in the last image column $S_{64}$ of the first sub-area $T_1$, etc.

Moreover, of course, this method is not restricted to the use for detectors with only vertically subdivided sub-areas $T_1$ to $T_N$. Evidently it can also be used for detectors which are subdivided, for example into a plurality of vertical sub-areas and additionally in a plurality of horizontal sub-areas.

Various methods can be applied in order to enhance the reliability of the method and to avoid errors due to natural gradients in the image which are not related to the boundary G between two sub-areas $T_1$ to $T_N$; they can also be used in combined form:

1. Only correction values of the pixels along a boundary for which the correction values do not deviate excessively from one another because of the right-hand and left-hand extrapolation are taken into account.
2. Correction factors which lie outside a given, predetermined correction factor range are not taken into account.
3. Correction values for which the gradient of the grey scale value relative to the grey scale value (that is, the slope of the gradient) exceeds a maximum value fixed between the sub-areas (absolute limit value of the gradient) are not taken into account.
4. Correction values which deviate too much from the correction values of a previously determined adaptation table are not taken into account.
5. A smoothing operation is performed on the non-empty entries in the adaptation table so as to allow only small variations of the correction factors.
6. All entries of the adaptation table are reduced as soon as a given maximum deviation value is exceeded. This restriction is related to the maximum non-linearity specification of the individual amplification channels and can best be illustrated on the basis of an example. For example, when the correction factor within an adaptation table of a given sub-area amounts to 1.01 in the case of a low grey scale value and to 1.05 in the case of a high grey scale value, the non-linearity of this sub-area, in comparison with the neighboring sub-area, amounts to (1.05−1.01)×100%=4%. However, when it is known on the basis of the specification of the amplifier that the non-linearity amounts to only 0.5%, the maximum non-linearity between two channels can inherently amount to no more than twice the non-linearity of a single amplifier only, that is, 1%. In this case the non-linearity entered in the adaptation table can be reduced from 4% to 1% by dividing the entire range by 4. More specifically, in as far as the entries in the adaptation table concern correction factors, the value 1 can then first be subtracted from each individual entry, after which the overall mean value is determined for all entries and the deviations from the mean value are divided by the factor 4. It will be clear that such an adaptation requires an extremely large amount of calculation work.

The method can be used for single exposures in that the correction values determined from the image are applied to the image itself. However, it can be used equally well for a sequence of successive images, in which case the correction values are advantageously derived from an adaptation table which is formed from the image data of the preceding images and is checked and corrected at regular intervals by way of correction values derived from newly acquired images.

The method can be used for a wide range of different image pick-up systems. It serves mainly to eliminate the visibility of the differences in the non-linearity of the preamplifiers in flat dynamic X-ray detectors (FDXD), but is not restricted to such an application. The XTV16 image sensor is a further example of an image pick-up system in which the method can be used. In this detector different sensors and preamplifiers are used for the even and the odd image columns. Because each sub-area in this detector consists of only a single column, however, the method of extrapolation over several pixels cannot be used; adaptation is then performed by comparison of neighboring pixels. Most of the methods described for the above embodiment for the combination of different correction values of one and the same grey scale value and for the enhancement of the reliability can also be performed for such a comparison of individual pixels without extrapolation.

The method can in principle be used even for performing a masking correction by defining a set of concentric circles as different sub-areas of the individually arriving image.

What is claimed is:

1. A device for forming an image from a plurality of sub images, the device comprising:
    a single-surface flat, dynamic x-ray detector which includes a plurality of sensor elements for generating image data, said sensor elements arranged in groups for forming a plurality of sub-areas (T1 to TN) of the image, where each sub-image corresponds to each sub-area;
    read-out units ($V_1$ to $V_N$) associated with the sub-areas ($T_1$ to $T_N$) of the image,
    an analysis unit arranged to evaluate image data from adjoining image areas ($S_{63}$ and $S_{66}$) of neighboring sub-areas ($T_1$ and $T_2$) and to generate correction data in accordance with said image area evaluation, and
    a correction unit arranged to correct incorrect image data using the correction data.

2. The device as claimed in claim 1, wherein the sensor elements arranged in rows and columns forming a matrix.

3. The device as claimed in claim 2, wherein the rows or columns, or parts thereof, constitute an image area, that a plurality of image areas constitute a sub-area, and wherein amplifiers are included to read out image data from the sub-areas.

4. The device as claimed in claim 1, further comprising a memory for storing the correction data.

5. The device as claimed in claim 1, wherein the image data is applied to the analysis unit at a reduced rate.

6. The device as claimed in claim 3, wherein the analysis unit is arranged to receive image data from adjoining columns of neighboring amplifiers, and includes a histogram generator for generating histograms of the image data received, and
    a summing unit for forming cumulative histograms from the histograms, and
    an adaptation unit for forming a functional dependency between the amplification characteristics of the amplifiers of neighboring columns and for generating correction data.

7. The device as claimed in claim 6, wherein the histogram generator is arranged to receive the image data and to generate histograms over a selectable period of time.

8. The device as claimed in claim 1, wherein
    the analysis unit further comprising means for forming an estimated value ($SW_{65}$) for the image value ($GW_{65}$) of a pixel ($P_{65}$) of a sub-area ($T_2$) to be corrected, the pixel ($P_{65}$) being situated at a boundary (G) with a neighboring sub-area ($T_1$), while utilizing an image value ($GW_{64}$) of the adjoining image area ($S_{64}$) of the neighboring sub-area ($T_1$), and
    means for forming a correction value for the relevant image value ($GW_{65}$) in the sub-area ($T_2$) to be corrected by comparison of the actual image value $SW_{65}$ of the pixel ($P_{65}$) with the estimated value ($SW_{65}$).

9. The device as claimed in claim 8, wherein
    the analysis unit further comprises means for extrapolating across the boundary (G) the image values ($GW_{63}$, $GW_{64}$) of pixels ($P_{63}$, $P_{64}$) of an image area ($S_{63}$, $S_{64}$) of the neighboring sub-area (T1), adjoining the pixel ($P_{65}$) of the sub-area ($T_2$) to be corrected.

10. An X-ray examination apparatus which includes an X-ray source for emitting X-rays and for forming an X-ray image, a flat dynamic X-ray detector for forming an optical image from the X-ray image, which detector includes sensor elements arranged in rows and columns and at least two amplifiers ($V_1$ to $V_N$) for reading out detected image data, at least one amplifier being associated with each of a plurality of sub-areas ($T_1$ to $T_N$) in order to read out detected image data, comprising
    an analysis unit for forming correction data on the basis of the evaluation of image data from adjoining image areas ($S_{64}$ and $S_{65}$) of neighboring sub-areas ($T_1$ and $T_2$), and
    a correction unit for correcting the incorrect image data by means of the correction data.

11. A computer program stored on a computer readable medium for the correction of image data derived from a single-surface detector comprising a plurality of sub-areas ($T_1$ to $T_N$), wherein a respective read-out unit ($V_1$ to $V_N$) is associated with sub-areas ($T_1$ to $T_N$) of the image and image data from image areas ($S_{64}$ and $S_{65}$) of adjoining sub-areas ($T_1$ and $T_2$) of neighboring read-out units ($V_1$ and $V_2$) is evaluated by formation of histograms in order to generate correction data after integration of the histograms, which correction data is used to adapt the image data from one sub-area ($T_2$) to the amplifier characteristic of the read-out unit ($V_1$) which amplifies the adjoining sub-area ($T_1$) to mitigate differences between said the amplifier characteristics.

* * * * *